July 11, 1972  R. A. SOREF  3,675,988
LIQUID CRYSTAL ELECTRO-OPTICAL MEASUREMENT AND DISPLAY DEVICES
Filed Nov. 25, 1969  10 Sheets-Sheet 1

INVENTOR
RICHARD A. SOREF
BY
H P Jerry
ATTORNEY

INVENTOR
RICHARD A. SOREF
BY
ATTORNEY

INVENTOR
RICHARD A. SOREF
BY

*H P Jerry*
ATTORNEY

July 11, 1972   R. A. SOREF   3,675,988
LIQUID CRYSTAL ELECTRO-OPTICAL MEASUREMENT AND DISPLAY DEVICES
Filed Nov. 25, 1969   10 Sheets-Sheet 7

INVENTOR
RICHARD A. SOREF
BY
*H P Ferry*
ATTORNEY

July 11, 1972   R. A. SOREF   3,675,988
LIQUID CRYSTAL ELECTRO-OPTICAL MEASUREMENT AND DISPLAY DEVICES
Filed Nov. 25, 1969   10 Sheets-Sheet 8

INVENTOR
RICHARD A. SOREF
BY
ATTORNEY

July 11, 1972  R. A. SOREF  3,675,988
LIQUID CRYSTAL ELECTRO-OPTICAL MEASUREMENT AND DISPLAY DEVICES
Filed Nov. 25, 1969  10 Sheets-Sheet 9

INVENTOR
RICHARD A. SOREF
BY
*[signature]*
ATTORNEY

3,675,988
Patented July 11, 1972

3,675,988
LIQUID CRYSTAL ELECTRO-OPTICAL MEASUREMENT AND DISPLAY DEVICES

Richard A. Soref, Chestnut Hill, Mass., assignor to Sperry Rand Corporation, Great Neck, N.Y.
Filed Nov. 25, 1969, Ser. No. 879,645
Int. Cl. G01r 5/22; G02f 1/26, 1/28
U.S. Cl. 350—160                                22 Claims

ABSTRACT OF THE DISCLOSURE

A flat screen electrically controlled, display device is provided that includes a layer of liquid crystalline material of the nematic type. The liquid crystals is one whose optical scattering or translucence is a sensitive function of the electric field in it. The nematic material is placed in a flat-sided cell between a transparent planar front electrode and a back electrode that is transparent or specularly reflecting. A spatial voltage gradient is generated across the transparent front electrode, while the whole of the back electrode may be held at a particular potential. Continuous relative changes of the respective potentials provide continuous or analog movement of the borders between clear and translucent areas formed within the nematic medium.

BACKGROUND OF THE INVENTION

(1) Field of the invention

The invention relates to electrically controllable, flat panel display devices employing liquid crystalline materials as electrically active media and more particularly relates to such display devices in which the size, shape, and location of two-dimensional display patterns can be changed continuously as well as in discrete steps.

(2) Description of the prior art

Certain classes of nematic crystal materials have been found to exhibit dynamic scattering electro-optical effects. For example, one material, known to the industry as anisylidene para-amino-phenyl-acetate, exhibits such optical properties at temperatures lying between 83° and 110° centigrade. The pure material is substantially transparent to visible light, has a resistivity on the order of 1 to $5 \times 10^{10}$ ohm-centimeters, and a dielectric constant of about 3.5 at 90° centigrade. Another available material operates, for instance, in room temperature ranges, such as from 10° to 47° centigrade.

Generally, materials that are members of a class of organic compounds known as Schiff bases present superior dynamic light scattering effects of the above type. One such dynamic scatterer of interest is p-anisylidine-p-butylaniline.

Such nematic liquid crystal materials offer utility in electrically controlled display devices of the flat panel type. For instance, one prior art application of electrically controllable dynamic scattering materials employs a structure which is a cell of sandwich configuration comprising a transparent planar front electrode and a specularly reflective back electrode closely spaced with respect thereto. Between the two electrodes is a layer of nematic material about 0.25 to 1.00 mil in thickness.

With no electric field applied between the two electrodes, the liquid crystal material is optically transparent. Thus, if the back electrode is black, the cell looks black to a viewer looking into it through its transparent planar front. However, when a unidirectional electric field is applied between the electrodes, the liquid abruptly loses its transparent characteristic, scattering any light entering it through its transparent front electrode. In this state, the scattered light is returned to the viewer, and the apparent color of the cell is of substantially the same spectral content as the light passing into it through the front electrode; i.e., white in the usual circumstance. When the field is removed, the material abruptly reverts to its transparent state.

Actually, in the presence of the electric field, the incoming light is mainly forward scattered (toward the back electrode), rather than back scattered directly to the observer. Therefore, the observer in one form of the device is enabled to see the effect because of the presence of the specularly reflecting back electrode. The latter redirects the forward scattered light back through the liquid crystal layer to the observer, inducing further scattering.

The scattering effect in the presence of an electric field has been explained as being caused by localized variations in the index of refraction of the medium produced when groups of neutral molecules within the medium are set into motion by an electric field. Apparently, ions set in motion through the normally aligned nematic medium supply the initial shearing disruptive effects. Therefore, some speak of the scattering effect as one produced by the presence of turbulence within the medium. While the foregoing discussion of the prior art has been in terms of materials that may be called dynamic scattering materials, it should be observed that there also exist certain liquid crystals called quiescent scatters which scatter light in the absence of an electric field and become transparent in the presence of such a field.

For many display applications, liquid crystal materials which instantaneously react to the application or removal of an electric field are desirable; i.e., that provide rapid formation of the image and especially also its rapid change in response to the removal of the stimulus that produced it; e.g., complete changes from state to state in a few microseconds. On the other hand, applications such as storage displays have demanded displays with memory features; i.e., displays which do not disappear at once with the removal of the voltages which generate them. Memory types of displays have been successfully demonstrated using liquid crystals materials comprising mixtures of nematic and cholesteric chemicals. These mixtures exhibit electric-field-controlled light reflection because of ion motion produced by the electric field, causing quasi-emulsification of the initially transparent material and giving it a milky appearace. However, the milky appearance is sustained after the exciting electric field is removed and may be removed, for example, by applying alternating fields of certain frequencies, after which application the material is available for imposition of a new display-exciting voltage.

Displays of the above types have several distinct advantages. Because the display is passive in the sense that it uses, for instance, reflected available ambient light rather than generating its own light, the display retains its good contrast characteristics under conditions of high ambient light intensity. Increasing the ambient light level simply increases the apparent brightness of the opaque white areas (where white light is used), having substantially no effect upon transparent areas. Display operation in bright sunlight is thus readily achieved, because the liquid crystal display gains in brightness as its surroundings become brighter.

Displays of the above types have certain marked limitations which the present invention overcomes. The prior displays are inherently digital or discrete in nature; a multiplicity of discrete fixed-area electrode segments is employed, for example, often in regular arrays.

The prior liquid crystal displays are panels with a plurality of discrete electrodes, segments formed on the display electrode surface, isolated spatially and electrically from one another. Energization of the display is such that discrete areas of nematic material are either excited or are not excited; i.e., are fully bright in appearance or are dark. Continuous or analog change of the display is therefore not possible in such multiple discrete-electrode segment displays.

It is not possible continuously to change the shape of a display pattern in the prior art device, nor to move it from one position of the display panel to another without superposing unpleasant jumping of the pattern shape as individual electrode segments come into play or are removed from contributing to the image pattern. The image pattern cannot be continuously enlarged or diminished with its center being held fixed on the screen; instead, the pattern will change in size by quantized jumps. Thus, the size, shape, and location of a display pattern can be changed only discontinuously.

Since the prior art liquid crystal displays have panels of discrete electrode segments formed on their display surfaces, and their electrode segments must each individually be supplied with an independent control voltage, each segment is required to have its own insulated lead-in or control voltage line. The consequent large plurality of control voltage lines is a serious disadvantage if the number of electrode segments is acceptably large. If a compromise choice is made to permit use of an acceptable number of control voltage leads, the amount of data elements that can be displayed is correspondingly diminished. Thus, the area available for display is not utilized efficiently.

SUMMARY OF THE INVENTION

The invention relates to means for producing a continuously scannable, continuously movable, and a continuously alterable, bright display-image by means of crystalline liquid media of the types exhibiting dynamic scattering or related phenomena, which media may be controlled to be transparent or optically scattering by simple control circuits operating in the novel display at relatively low voltage and power levels. The invention provides an electrically controllable flat screen display by placing a nematic medium between electrode plates, at least one of which is transparent, the electrode plates forming part of a cell enclosing the nematic medium. The transparent electrode means is provided with two or more usually different electrical potentials at suitable terminals so that electrical field gradients are generated across the nematic medium and a plurality of image configurations may thus be generated by the influence of the electric fields upon the nematic medium, the images consisting of transparent and translucent areas. A variety of images may be generated, including large area, time-alterable, transparent patterns in a translucent background, or vice versa. An opaque panel can be scanned with a small moving bright spot. Dependent upon the character of electrode shapes, terminal shapes, and magnitudes of potentials, a variable length bar or moving arrow can be displayed or a moving window formed, displays applicable, for instance, as voltmeter displays. Multi-layer cells, each cell having a particular characteristic, can form composite displays, for example, where a window formed by one display cell overlaps that formed by a second display cell.

BRIEF DESCRIPTION OF THE DRAWINGS

Referring now to the drawings:

FIGS. 22a to 22h are successive views of a display produced by the invention of FIG. 21.

FIG. 23 is a cross section view of another form of the invention.

FIG. 24 is a front view of the apparatus of FIG. 23.

DESCRIPTION OF PREFERRED EMBODIMENTS OF THE INVENTION

Preferred embodiments of the invention will be discussed by arbitrarily selecting a particular one of the available room temperature nematic materials as the active light scatterer; namely, a nematic material available, from Liquid Crystal Industries, 460 Brown Ave., Turtle Creek, Pennsylvania. This material has nematic characteristics between 18° and 80° centigrade, so that in many circumstances, the temperature of the display apparatus using such a material would not need to be controlled.

The selected representative material is one of the several available room temperature liquid crystals that exhibit dynamic scattering or electric field-induced turbulence. The liquid crystal material is initially in a transparent state, but when a unidirectional electric field is imposed upon it, it becomes turbulent. The turbulent fluid scatters incident light strongly, and optical transmission through the fluid decreases greatly.

Figure 1:
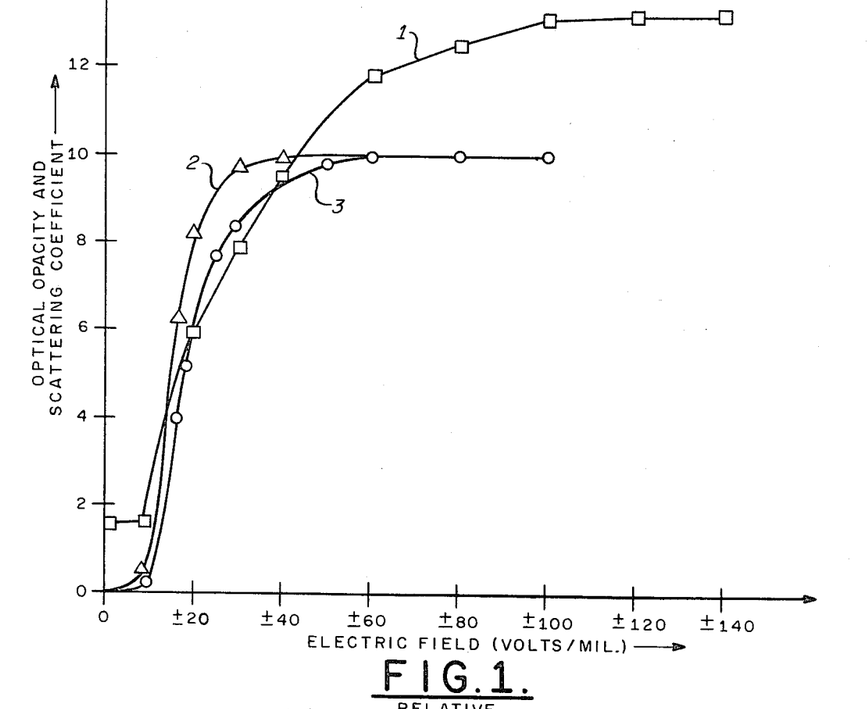
FIG. 1 is a graph useful in explaining the properties of materials used in the invention.

A particular nematic material has been selected by way of illustration so that representative characteristics of the material fundamental to the operation of the invention may be considered. Measured characteristics of the electro-optical scattering characeristic are represented in FIG. 1 for a particular sample of the material. Here, the optical opacity and scattering coefficient of the selected material sample have been plotted as a function of the applied electric field.

In FIG. 1, curve 1 represents the room temperature scattering coefficient in arbitrary units for the selected sample for a small observation cone near the forward scattering direction in a 1.0 mil thick cell. Curves 2 and 3, on the other hand, show the room temperature optical opacity coefficient in the same arbitrary units for collimated light at normal incidence for 1.0 and 2.0 mil thick cells, respectively. The thickness dimension refers to the thickness of the liquid crystal layer in each instance.

As is characteristic of many other nematic materials, the curves are identical for either polarity of electric field, and all of the curves exhibit an optically clear region, a transition region, and a saturation region. Also, there is a well defined voltage threshold between the clear and opaque states of the sampled material, and this threshold is sharper for on-axis transmitted light (curves 2 and 3) than for scattered light (curve 1). As is also characteristic of many nematic materials, the voltage threshold between the clear and opaque states is sharper for a 2.0 mil thick cell than for a 1.0 mil thick cell, but the thicker cell has a somewhat slower time of response to the electric field.

Figure 2:
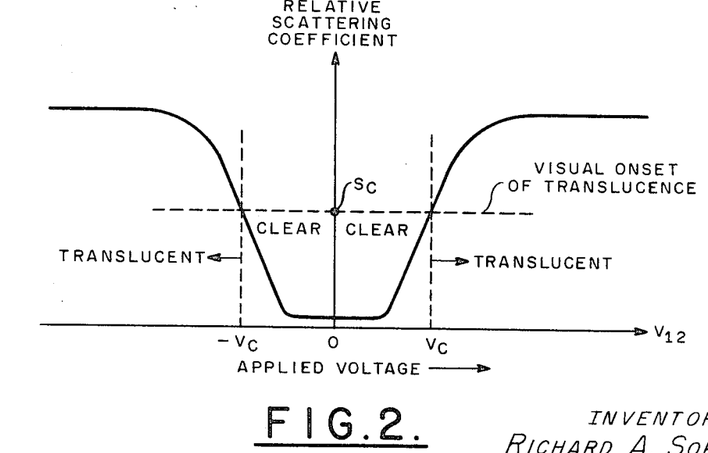
FIG. 2 is a graph useful in explaining the general manner of operation of the invention.

To aid in the discussion of the various embodiments of the invention about to be presented, let there be defined a critical voltage $V_c$ which corresponds to a critical scattering coefficient $S_c$. In particular, the critical scattering coefficient $S_c$ represents the visually recognized onset of translucence and is a demarcation point between clear and opaque areas in a liquid crystal display pattern. The behavior of the critical scattering coefficient $S_c$ is shown in FIG. 2, which is actually an "unfolded" version of curve 1 of FIG. 1. The curve of FIG. 2 is a characteristic curve for room temperature liquid crystals, with the transition points $-V_c$ and $V_c$ being more sharply defined in some liquids than in others.

Figure 3:
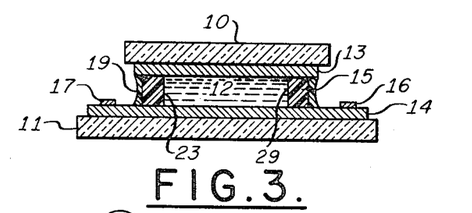
FIG. 3 is a cross section view of one form of the invention.
Figure 4:
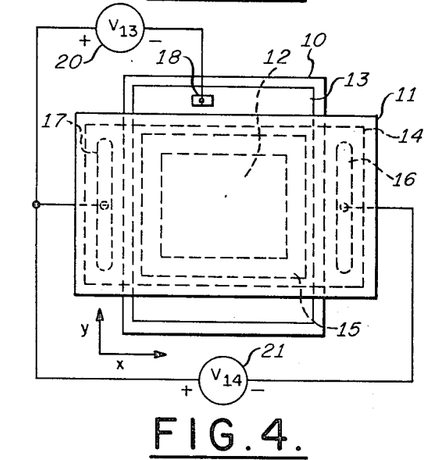
FIG. 4 is a front view of the form of the invention shown in FIG. 3.

Referring now to FIGS. 3 and 4, a typical construction for the invention is shown as utilizing a pair of parallel sided flat glasses plates 10 and 11 preferably arranged parallel to each other and separated by a thin layer 12 of electric field sensitive or nematic material of any of the aforementioned types. Plates 10 and plate 11 are coated on their inner surfaces with thin conducting electrode means 13 and 14, respectively. A cell for containing the nematic material is further defined by a continuous quadrilateral dielectric wall 15. Extended lineal or elongate terminals 16 and 17 are applied in conductive relation to electrode 14 on glass plate 11 at opposite ends of that electrode. By virtue of their relatively low resistance, terminals 16 and 17 have equipotential surfaces. A relatively small terminal 18 may be used in conductive relation with electrode 18 on glass plate 13.

Glass plates 10 and 11 may be made of any suitable glass or of other transparent insulating material compatible with the optical requirements of the cell system. For example, the material may be selected to have an optical index of refraction similar to that of the electric field sensitive or nematic material 12 so as to avoid undesired reflections at optical interfaces.

The transparent conducting electrodes 13 and 14 may be made of tin oxide, aluminum oxide, or similar materials put down on glass plates 10 and 11 by chemical or evaporative deposition, by sputtering, or by other suitable known methods. The choice of materials is such that conducting electrode 13 has a low resistivity of the order of 100 ohms per square, for example, so that the whole of electrode 18 may readily reach the same potential level as applied to terminal 13. On the other hand, the material of electrode 14 has a relatively high resistivity of about 500,000 ohms per square, for example. Other resistivity values may be employed, but a relatively high resistivity is beneficial because ohmic loss within electrode 14 is then minimized, thereby preventing appreciable temperature rise in the liquid crystal layer 12. Also, the current drawn from external power sources is desirably minimized. The resistivity characteristic of the material of electrode 14, which is put down on glass plate 11 (the plate that is normally considered to be the viewing plate of the cell) is of major importance to the operation of the invention, as will be described hereinafter.

So that the liquid crystal layer 12 may be contained in its pure form, protected from contaminants, and be of uniform thickness, dielectric wall 15 is formed as a continuous wall; it is readily constructed of a tape available in the market made of a polymerized fluorocarbon resin material sold under the trade name "Teflon." The tape is available in thicknesses of the order of 1.0 mil, a thickness suitable for use in the invention. The cell may be held together at least in part by a miniscus-shaped film 19 of epoxy material applied to the external free surface of wall 15 so that it bonds to that surface and to the adjacent exterior surfaces of electrodes 13 and 14.

The two elongated terminals 16 and 17 on plate 11 and the small terminal 18 on plate 10 may be constructed in the conventional manner from a silver electrically conducting epoxy material available on the market or by deposition of a strip of low conductivity tin oxide by one of the aforementioned processes. A voltage source 20 for supplying a voltage V13 is connected across terminals 18 and 17, while a second voltage source 21 is connected between the terminals 16 and 17 common to electrode 14 for supplying a voltage V14 thereacross.

It should be understood in considering the structure of the apparatus of FIG. 3 that the state of the liquid crystal layer 12 may, for instance, be viewed by the observer from above glass plate 11 through transparent electrode 14. It should also be understood that the drawing of FIG. 4 has been made for convenience as if one viewing the drawing is similarly looking through plate 11 and electrode 14. Below the plane of electrode means 14, the viewer sees the dielectric tape wall 15 and the liquid crystal layer 12. Below the plane in which the latter two items lie, the observer sees the second electrode means 13 and the second glass plate 10.

In operation, the apparatus of FIGS. 3 and 4 makes significant use of the spatial voltage gradient or variation set up across the transparent high resistance electrode means 14. While electrode means 13 may instead be used as the high resistance electrode, or both electrodes may be of high resistance material, only the electrode 14 will be considered to be a high resistivity electrode at this time for the sake of simplifying the discussion. With a potential gradient set up across electrode 14, the potential difference between electrodes 13 and 14 (which is the potential drop seen across the liquid crystal layer 12) varies from one spatial location across layer 12 to a next location. This potential variation gives rise to controllable regions of transparency and translucence within layer 12, providing that the values of V13 and V14 have been appropriately selected. The dimension of the transition region between transparent and translucent regions is relatively sharp if the selected liquid crystal medium has a highly non-linear scattering curve such as that of FIG. 2.

Figure 5:
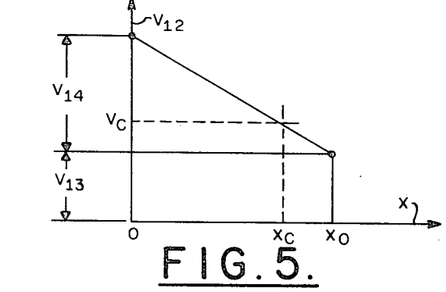
FIG. 5 is a graph useful in explaining the operation of the embodiment of FIGS. 3 and 4.

In the devices of FIGS. 3 and 4, the potential V12 across the liquid crystal or nematic layer 12 may be represented by the graph of FIG. 5, where the parameter $x$ is the right-left position coordinate in layer 12 ($x$ is zero at the left edge of layer 12). The potential distribution on electrode 14 is a function of $x$ only and is independent of $y$ because of the particular orientations of extended terminal means 16 and 17. Consider that V13 is much less than the critical potential level $V_c$, and that V14 is greater than or equal to $V_c$. Let $\rho_{13}$, $\rho_{14}$, and $\rho_{12}$ be the respective bulk resistivities of the electrode 13, of the electrode 14, and of liquid crystal layer 12. If $\rho_{13}$ is much larger than $\rho_{12}$ and if $\rho_{14}$ is much less than $\rho_{12}$, then V12 is found to be a linear function of $x$, as shown in FIG. 5.

Figure 6:
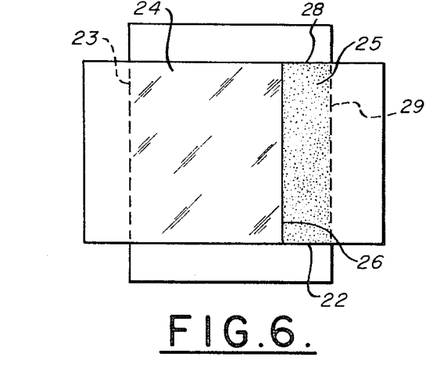
FIG. 6 is a view of the display produced by the embodiment of FIGS. 3 and 4.

By referring to FIG. 2, it is seen that the screen above liquid crystal layer 12 of FIG. 4 is opaque for $x$ less than $x_c$ and is clear for $x$ greater than $x_c$. The portion seen of the liquid crystal layer is confined by the dielectric wall 15 inner surfaces 22, 23, 28, 29 is shown in FIG. 6. The display comprises a rectangular bright area 24 and a rectangular dark area 25 with a common transition boundary 26. Boundary 26 is readily moved to the left or right by suitable relative variation of voltages V13 and V14, as above described.

In FIGS. 3 to 6, the rectangular bright area or bar 24 is changed in length ($x_c$ is changed) by changing the relative magnitudes of V13 and V14 according to a predetermined time pattern. The value of V13 may be held fixed, while the value of V14 may be changed, or vice versa. For example, consider the result when V13 is set to zero and V14 is increased from zero to a value above the $V_c$ value shown in FIG. 5. This causes the bright bar to increase in length from $x$ equals zero (to expand from border 23).

Figure 7:
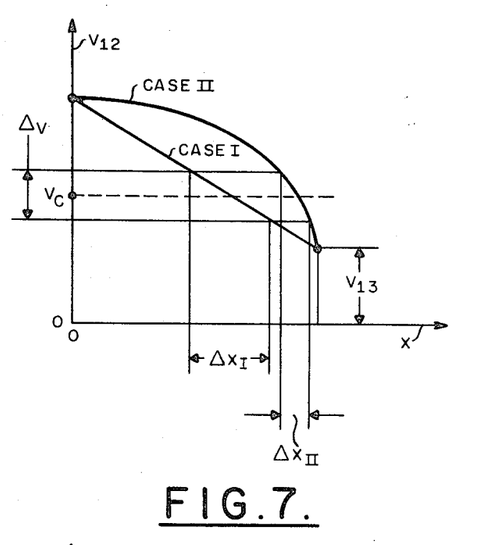
FIGS. 7 and 8 are graphs useful in explaining the operation of a modification of FIGS. 3 and 4.
Figure 8:
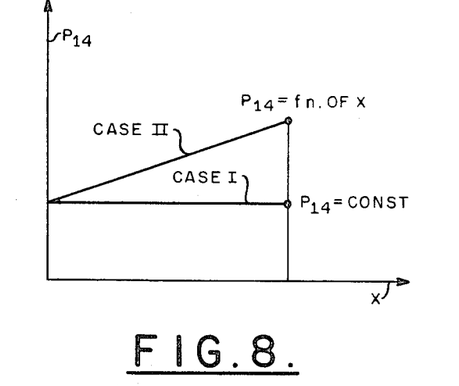

FIGS. 7 and 8 may be used to explain a modification of the apparatus of FIGS. 3 and 4. As noted previously, the transition border 26 actually has a finite width whose value $\Delta_x$ is linked to the width $\Delta_v$ of the electro-optic transition illustrated in FIG. 2. It is possible to decrease $\Delta_x$ desirably by tapering the resistivity $\rho_{14}$; i.e., by making $\rho_{14}$ a function of $x$. The figures compare a case I in which:

$$\rho_{14} = \text{a constant}$$

with a case II wherein:

$$\rho_{14} = ax + b$$

where $a$ and $b$ are arbitrary constants. It is seen that case I represents a linearly changing potential distribution on electrode 14, while case II represents a quadratic potential distribution. The latter or similar non-linear distributions may be achieved by controlling the amount of electrode material deposited on glass plate 11 by any of several conventional methods. It is evident that $\Delta_x$ is reduced in case II, but only over a relatively short region, so that the useful display length is shorter than in case I.

Figure 10:
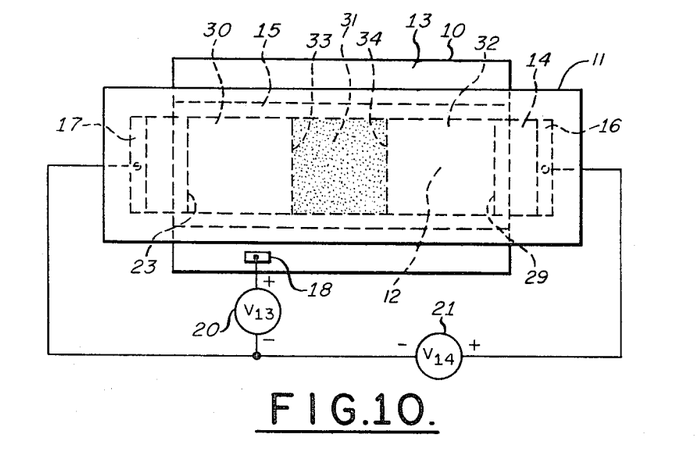
FIG. 10 is a front view of a further embodiment of the invention.

The liquid crystal cell arrangement of FIG. 10 illustrates a system in which one can, in essence, create two of the bright moving bars like the one used in FIG. 6 and can cause them to move in cooperative relation so as to expose a movable window or dark area, for example, of constant width. The liquid crystal cell itself may be similar to that employed in FIGS. 3 and 4, but the controlling voltages are applied in a new manner which illustrates the versatility of the invention. Accordingly, corresponding reference numerals are used for parts that correspond in FIGS. 4 and 10 and the structure of FIG. 10 need not, therefore, be discussed in detail.

However, the FIG. 10 structure is seen to include a pair of parallel-sided plates 10 and 11 separated in parallel relation by a layer of nematic material. Plates 10 and 11 are respectively coated on their inner surfaces with electrodes 13 and 14. The volume of electric field sensitive material is further bounded by a continuous rectangular wall 15 of thin dielectric tape. Lineal or elongate terminals 16 and 17 are applied to electrode 14 at its opposite ends, while a single small terminal 18 is applied to electrode 13. As in FIG. 4, electrode 13 has a relatively low resistivity, while electrode 14 may have a relatively high resistivity.

Figure 9:
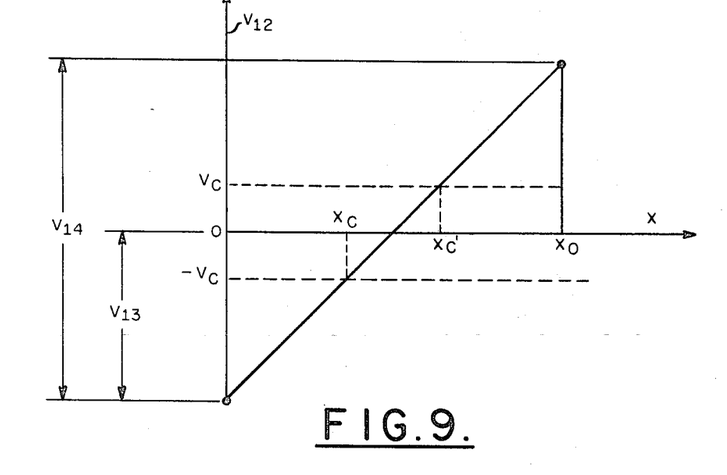
FIG. 9 is a graph useful in explaining a further embodiment of the invention.

In the case of FIG. 10, the potential V12 is arranged to go through a zero value, as shown in FIG. 9, starting at a negative value at terminal 17 and ending at a positive value at terminal 16. As is seen from FIG. 9, the voltage V14 is taken to be about twice that of V13, so that the symmetric distribution shown in FIG. 9 is attained.

The voltage sources 20 and 21 are connected in a subtractive sense, rather than additively as in FIG. 4. Because of the polarity-independent nature of the graph of FIG. 2, the distribution of the voltage V12 across the liquid crystal layer 12 provides a dark window between $x$ equals $x_c$ and $x$ equals $x_c'$. It is seen that if V14 is held constant while V13 is varied, a moving window 31 of fixed width is generated. On the other hand, if V13 is held constant and V14 is varied, the width of the window 31 is varied. Combinations of the two modes are also possible in which V13 and V14 are both varied according to a predetermined desired pattern.

Thus, the display of FIG. 10 consists of three portions. First, there may be a bright rectangular area 30 extending from wall surface 23 to the transition point $x_c$ at 33, followed by a dark area 31 extending from boundary 33 to the transition point $x_c'$ at 34. The second bright area 32 extends from boundary 34 to the wall surface 29.

The arrangements of FIGS. 4 or 10 may be used to provide indicator elements or pointers by providing variable length bars or movable windows to tell a viewer the magnitude of any parameter which may be converted into a voltage and used as one of the voltages V13 or V14. Vertical or horizontal formats are equally possible for the display of temperature, pressure, velocity, acceleration, or other parameters. A suitable scale may be provided beside the bar presentation, for instance, and values of the parameter involved may be read directly off the scale. The scale may itself be generated by constant excitation of nematic cells shaped or masked to form numerals.

Figure 11:
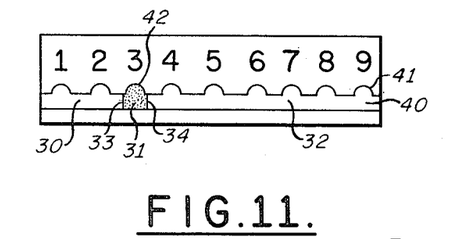
FIG. 11 is a view of the display produced by a modification of the embodiment of FIG. 10.

For example, FIG. 11 represents the appearance of a window type of voltmeter indicator with an index scale running from 1 to 9 in cooperative relation therewith. Certain elements are similar to those generated in the window presentation shown in FIG. 9 and therefore bear corresponding reference numerals. For example, the presentation 40 includes a bright bar 30 ending at transition boundary 33 and a dark area 31 serving as a pointer and ending at boundary 34 where the second bright area 32 begins and continues to the end of the scale. The usefulness of the display may be enhanced by shaping the electrode 14 (FIG. 4) with regularly arranged half-circular extensions. When in the illuminated state, the bright window 31 thus includes a bright pointer-like tip 42, for example, directed toward the index scale number 3.

The versatility of the present invention may be further appreciated upon considering the fact that the transparent conducting electrodes are not limited to being of rectangular or quadrilateral shape, but can indeed be formed in a variety of arbitrary shapes. Accordingly, voltage gradient patterns in polar coordinates and even in unconventional coordinate systems may be realized and, correspondingly, a variety of sophisticated presentations generated. Alteration of the patterns may also be achieved by employing extended low-resistance terminals in the shape of circles or other configurations in addition to lineal or elongate strips. The terminal patterns may include simple dots or quite irregular patterns.

Figure 12:
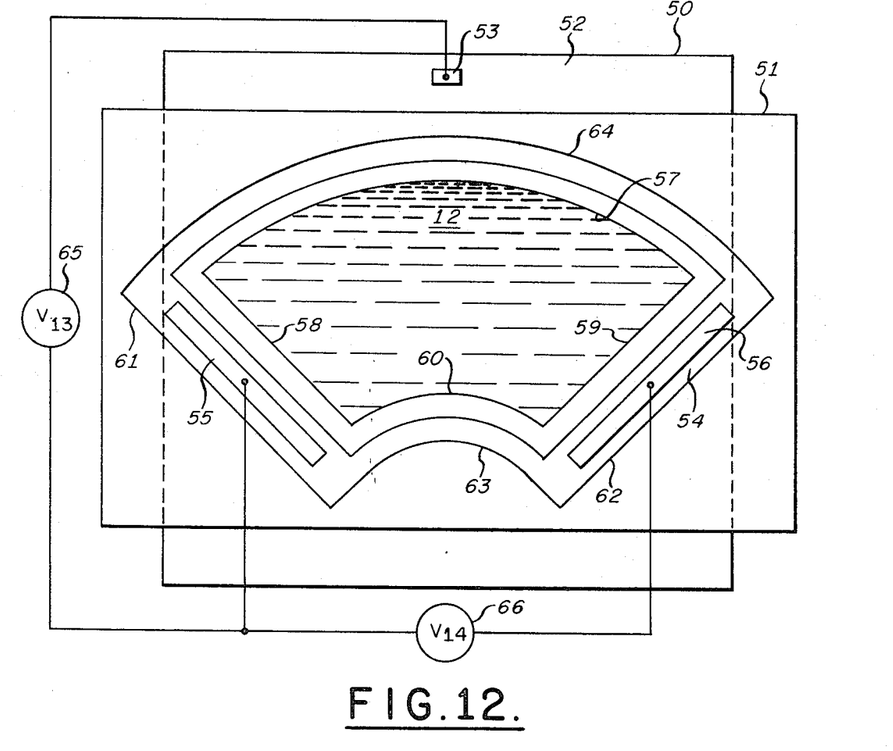
FIG. 12 is a front view of another form of the invention.
Figure 13:
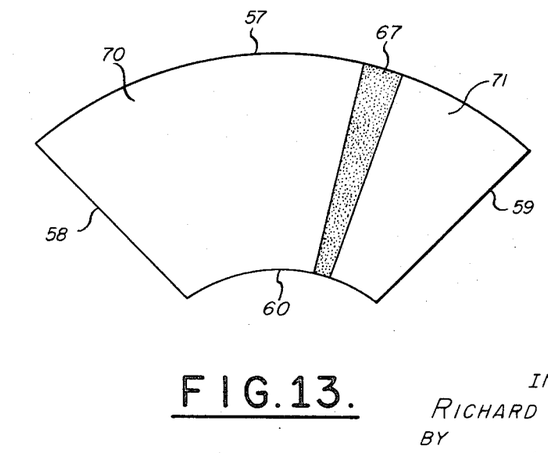
FIG. 13 is a view of the display produced by the device of FIG. 12.

For example, one type of indicator that produces a pointer or meter-like radial bar moving about a pivot point is seen in FIGS. 12 and 13. Like the apparatus of FIGS. 4 and 9, the inventive embodiment uses a first flat glass plate 50 with a rectangular electrode means 52 and a second flat glass plate 51. Plate 51 is coated with a specially shaped transparent electrode means 54; it is seen that electrode 54 has a pair of lineal edges 61 and 62 extending in a radial sense. One set of corresponding ends of edges 61 and 62 is coupled by an arcuate edge 63; the other set of corresponding ends of edges 61 and 62 is coupled by a second arcuate edge 64 of greater radius than edge 63, the two having a substantially common center of curvature. Adjacent edges 61 and 62 are located lineal low resistance terminals 55 and 56, respectively. The field sensitive liquid crystal material 12 is further confined by a thin dielectric wall consisting of sides providing an enclosure substantially similar in shape to the sector shaped electrode 54; namely, a hermetic wall consisting of radially extending wall elements 58 and 59 and cooperating arcuate elements 57 and 60. Electrode means 54 is not only of special shape, but its resistivity characteristics are specially distributed. To achieve the sector window presentation of FIG. 13, it is necessary to make the short radius portion adjacent edge 63 of the transparent conducting sector electrode 54 have higher resistivity than the outer-radius portion adjacent edge 64. Thus, the resistivity is made to taper in value, preferably in a linear fashion, between edges 63 and 64. The shape and thickness of the electrode 54 can readily be realized using conventional chemical etching or vacuum deposition techniques.

A voltage source 66 is used to supply voltage V14 to the lineal terminals 55 and 56. Voltage V13 is placed between one of the extended lineal terminals (55) of electrode 54 and the small terminal 53 of the second electrode 53. With the magnitudes V13 and V14 adjusted as in the instance of the arrangement of FIG. 9 when a movable dark window is produced, the radial bar 67 is presented, as seen in FIG. 13. The indication includes a bright sector 70 bounded by radial wall 58 and partly by arcuate walls 57 and 60, followed by a thin dark sector 67, followed in turn by a bright sector 71 bounded by radial wall 59 and portions of arcuate walls 57 and 60.

Figure 14:
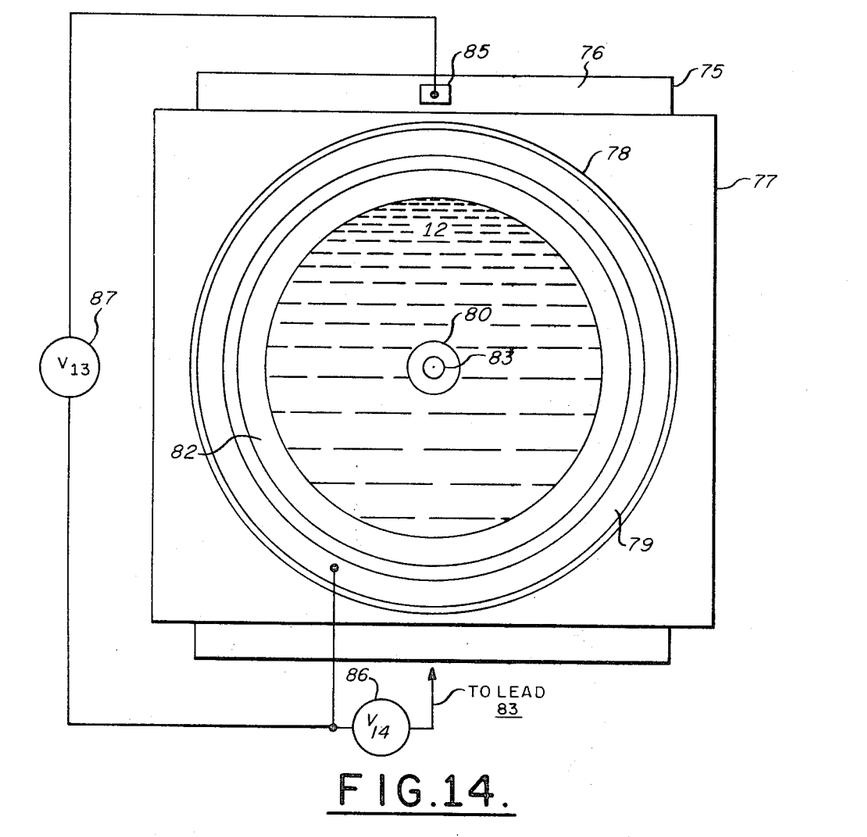
FIG. 14 is a front view of an additional embodiment of the invention.
Figure 17:
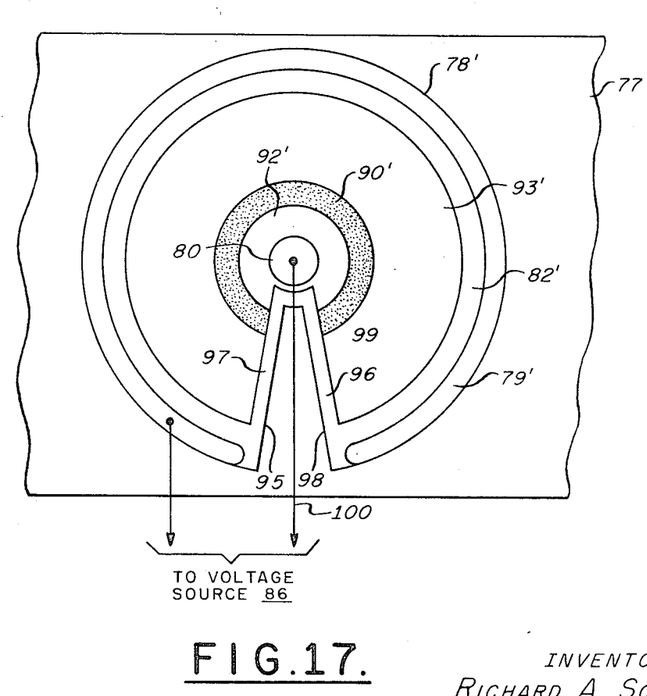
FIG. 17 is a front view of an alternate form of the device of FIGS. 14 and 15.

Forms of the invention which, like that of FIG. 12, can be said to represent conformal transformations of the devices of FIG. 4 or 9, are illustrated in the two related embodiments of FIGS. 14 and 17. The objective is to form a dark ring-like presentation which may be expanded or shrunk about a center point.

The structure of the device of FIG. 14 includes the familiar first flat glass plate 75 with an inner surface rectangular electrode means 76 and a second flat glass plate 77. Plate 77 is coated on its inner surface with a circular transparent electrode means 78. A circular strip low-resistance terminal 79 is placed at the periphery of circular electrode 78. A second terminal 80 in the form of a small solid circle is placed at the center of circular electrode 78.

The field sensitive liquid crystal material 12 is further confined by a thin dielectric tape in the form of a circular wall 82 of slightly lesser outer diameter than the inside diameter of circular terminal 79. Wall 82 may be fastened to plates 75 and 77 with hermetic seals made by an epoxy or other cement, as previously described.

Figure 15:
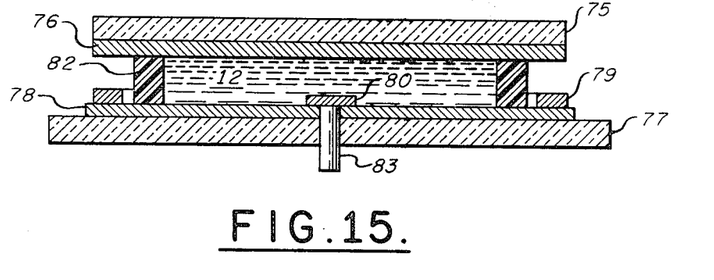
FIG. 15 is a cross section view of FIG. 14.

As seen in FIG. 15, one way of supplying necessary potentials to transparent electrode 78 is by way of the central electrical terminal lead 83 held by a glass-to-metal seal or other known sealing device in the center of plate 77 and electrode 78, through both of which lead 83 projects so as to make electrical contact with low resistance terminal 80.

Figure 16:
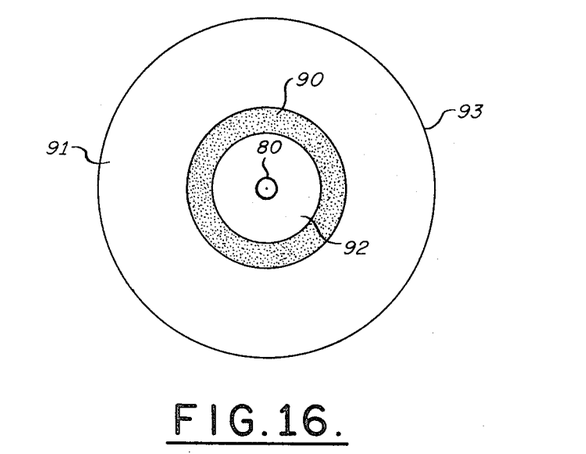
FIG. 16 is a view of the display produced by the apparatus of FIGS. 14 and 15.

As is seen in FIG. 14, a voltage source 86 is used to supply voltage V14 between low resistance circular terminal 79 and the terminal lead 83 protruding from the viewing face of plate 77. Likewise, a voltage V13 is again supplied to a small low resistance terminal 85 on electrode 76 from voltage source 87 connected to terminal 85 and circular terminal 79. With the magnitudes of V13 and V14 adjusted according to the previously described method when a movable annular dark window is to be produced, the ring presentation 90 of FIG. 16 is produced. The dark ring 90 is surrounded by concentric annular region 91 which is bright in appearance and ring 90 surrounds a second bright ring which is a solid circle about terminal 80.

In the modification shown in the fragmentary view of FIG. 17, there is produced only a major arc sector 90' of the dark circle 90 produced in the arrangement of FIG. 14. The device of FIG. 17 will be understood upon observing that it is similar to that of FIG. 14, with the major exception that a sector has been cut out of the transparent electrode 78 of FIG. 14; this is for the purpose of providing an alternate way of supplying potential to the dot terminal 80 avoiding use of terminal lead 83 projecting through viewing plate 77.

In FIG. 17, transparent electrode 78' has a sectorial area eliminated, being bounded in that area by radial edges 95 and 98. The peripheral low resistance terminal 79' extends in an arc ending at sector edges 95 and 98. The dielectric wall 82' encompassed by terminal 79' has a similar angular extent, but it is now necessary to complete the liquid-crystal-retaining envelope by radial wall elements 96 and 97 and the short wall element 99. These wall elements, together with the arcuate wall 82', combine with suitable sealant means to function as a part of the hermetically sealed envelope enclosing the nematic or field sensitive material. It is to be observed that lead wire 100 attached to terminal 80 is now simply brought out of the cell through dielectric wall element 99.

A view of the arcuate presentation generated is also shown in FIG. 17. Voltages V13 and V14, generated and coupled into the cell as in FIG. 14, are adjusted as previously described to cause formation of a movable arcuate dark window 90'. The dark arc 90' is surrounded by a concentric arcuate region 93' which appears bright to the viewer and arc 90' surrounds a second bright region 92' missing a sector aligned with the sector missing from bright region 93'.

As noted previously, the electrodes associated with the inventive display may vary widely in character. For example, one electrode in the apparatus of FIG. 4 has relatively high resistivity so that a voltage gradient may be set up in it, while a second electrode is of low resistivity material and functions as an equipotential surface. As noted previously, other combinations of resistivity characteristics may be employed in the inventive apparatus. In a cell with two electrodes, for example, the resistivity patterns of the two electrodes may be similar or may differ in any of a variety of ways.

Figure 18:
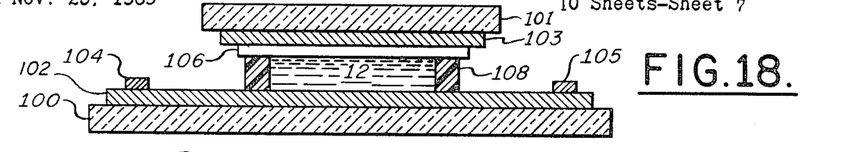
FIG. 18 is a cross section view of a still additional form of the invention.
Figure 19:
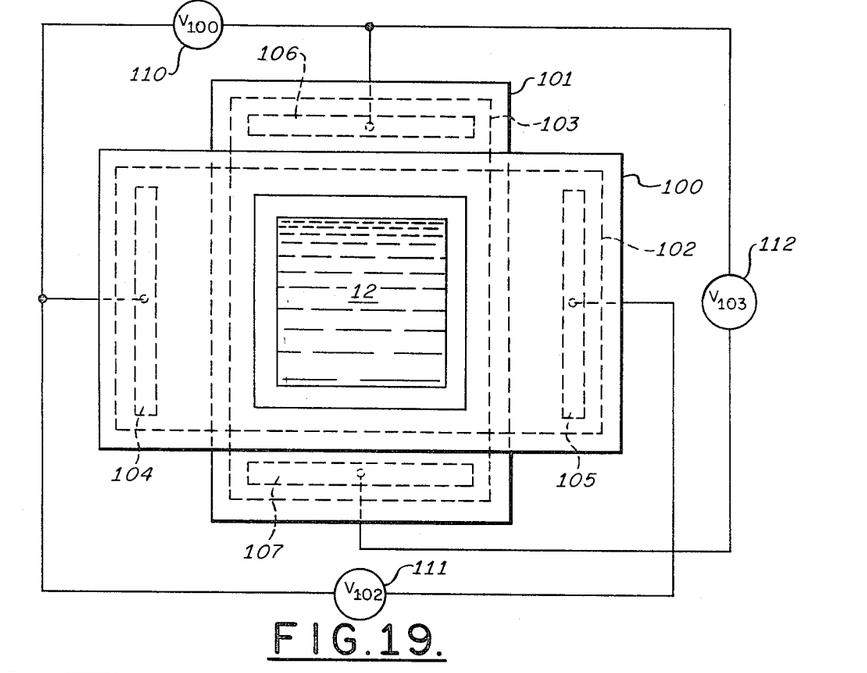
FIG. 19 is a front view of the apparatus shown in FIG. 18.

A representative form of the invention in which electrodes with similar resistivity patterns are employed is illustrated in FIGS. 18 and 19. In general, two similar high-resistivity electrode means of similar high-resistivity material may be used, each electrode similar, for instance to the high resistivity electrode 14 on plate 11 of the cell of FIG. 4. The electrodes in FIG. 19 are crossed, however, in such a sense that the influence of the voltage gradient in one electrode is at right angle to the influence of the voltage gradient in the other electrode, though angles other than 90 could be employed. It can be seen by considering the mechanism of operation of the apparatus of FIG. 4 that the voltage V12 can now be controlled in two spatial dimensions, as well as a function of time.

Referring to FIGS. 18 and 19, it is seen that a novel form of the invention comprises first and second flat glass plates 100 and 101. Each has its inner surface coated with a relatively high resistivity electrode means in the form of electrodes 102 and 103, respectively. A quadrilateral wall 108 of dielectric material further cooperates to form a hermetically sealed cell volume, as before, for protecting and containing the field sensitive liquid crystal material 12.

Each of electrode means 102 and 103 is supplied with extended lineal low resistance terminals, the pair of lineal terminals associated with one electrode surface being at right angles to the pair of terminals associated with the second electrode surface. For example, electrode 102 has extended low resistance terminals 104 and 105 adjacent and parallel to its opposite edges, which electrode 103 has similar terminals 106, 107 adjacent and parallel to its respective opposite edges. Terminal pairs 104, 105 are at right angles to terminal pairs 106, 107.

Three voltage generator devices are now employed. Device 110 supplies the voltage V100 between adjacent mutually perpendicular terminals 104 and 106 and between terminals 105 and 107. The x coordinate control voltage V102 is applied as in FIG. 4 by a device 111 whose output leads are coupled to the cooperating terminals 104, 105. Thus, voltage V102 produces a voltage gradient across electrode 102. Similarly, the y coordinate control voltage V103 is applied by a device 112 whose output leads are coupled to the cooperating terminals 106, 107. Thus, voltage V103 produces a voltage gradient across electrode 103.

It is evident that the value of voltage V100 seen at any $x, y$ location within the electric field sensitive liquid crystal material 12 is related to all three of the voltages V102, V103, and V100. It can, in fact, be shown that the voltage across layer 12 at any point $x, y$ for the case in which layer 12 has relatively high resistivity is:

$$V12\ (x, y, t) = V102\ (x, y, t) - V103\ (x, y, t) + V100\ (t)$$

or:

$$V12\ (x, y, t) = V104\ (x, t) - V103\ (y, t) + V100\ (t)$$

Figure 20A:
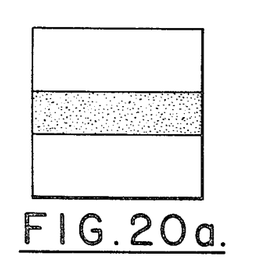
FIGS. 20a and 20e are views of typical displays produced by the embodiment of FIGS. 18 and 19.
Figure 20B:
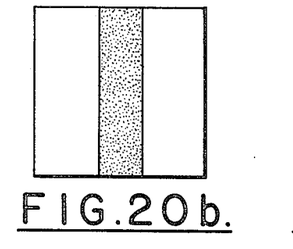
Figure 20C:
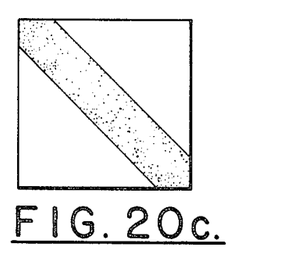

It can be analytically predicted and has been experimentally demonstrated that manipulation of the relative values of V100, V102, and V103 produces display patterns that are opaque bars of triangles, or transparent bars oriented in vertical, horizontal, or oblique directions. Desired pattern movements are accomplished by varying any or all of the above voltages according to a predetermined time program. Presentations of many types result by appropriate adjustment of the values of voltages V100, V102, and V103 in the circuit of FIG. 19. For example, not only can window displays similar to those produced in the simpler embodiments of the invention be produced (FIGS. 20a and 20b), but displays such as those of FIGS. 20c and 20d, as well. It will be appreciated that the display shapes of these figures may be continuously interchanged by continuous variation of the relations of the input voltages V100, V102, and V103 and that they may be moved vertically, horizontally, or obliquely.

The versatility of the device of FIGS. 18 and 19 is further illustrated by the variety of presentations that can be produced by it. For example, if there is no $x$ electric field gradient (no gradient in electrode 102), a presentation like that of FIG. 20e can be readily produced. With no $y$ field gradient, the FIG. 6 presentation results. Similarly, a dark vertical bar may be moved horizontally across the display; or a dark horizontal bar can be moved up or down.

Figures 20D, 20E:
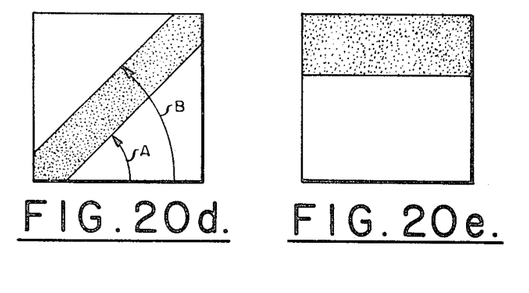

With values of V102, V103, and V100 appropriately selected, a representation like that of FIG. 20d results. The values of angles A and B FIG. 20d may widely adjusted by manipulation of the above three voltages. For example, the bar-like presentation of FIG. 20d can be achieved with angles A and B being substantially equal, both being readily variable.

Figure 21:
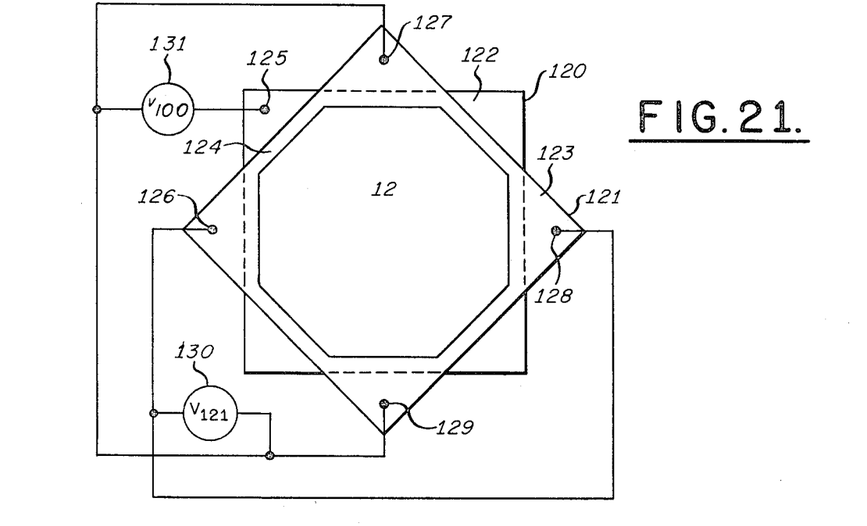
FIG. 21 is a front view of another embodiment of the invention.

Other combinations of voltage gradients within the liquid crystal cell are also useful. For example, FIG. 21 illustrates a configuration employing a quadripole field relationship which finds utility as a voltage balance or null detector indicator. The instrument includes a first or viewing glass plate with its inner surface being fully covered by a transparent electrode means 123. Electrode 123 is provided with small low-resistance terminals 126, 127, 128, and 129 at its four respective corners. The device also has a second flat glass plate 120 equipped with an electrode 122 and having a single, small, low-resistance terminal 125. The viewing electrode 123 has relatively high resistivity, while that of electrode 122 is low. A thin octagonal, equal-sized dielectric wall 124 is provided cooperating with an appropriate sealant to complete the cell and to enclose the liquid crystal material 12. Wall 124 also serves to hold electrodes 122 and 123 apart in fixed parallel relationship. Wall 124 is octagonal in shape because plates 120 and 121 are angularly displaced relative to each other by 90°.

Voltage V100 is supplied by generator 131 between terminal 125 of electrode 122 and the opposite terminals 127 and 129 of electrode 123. A voltage V121 to be compared to voltage V100 is supplied by source 130. One side of source 103 is connected to terminals 122 and 129 on opposed corners of electrode 123. The other side of source 130 is coupled to the remainig opposed pair of terminals 126 and 128 on electrode 123.

It can be shown analytically and has been experimentally demonstrated that the display responds, for instance, to the difference between voltages V100 and V121. The display indicates when a balanced adjustment has been arrived at by exhibiting substantially perfect symmetry about both horizontal and vertical centerlines of the display area (see FIG. 22). FIG. 22 also illustrates displays showing various degrees of differences between voltages V100 and V121.

The eight representations in FIG. 22 of displays generated by the apparatus of FIG. 21 were derived from photographs made experimentally to show how the null display varies as the ratio between voltages V100 and V121 is changed. For example, FIG. 22a shows the character of the pattern when V100 is of the same order of magnitude as V121; it is observed that the dark part of the pattern is generally symmetric about a vertical axis and that the part of the display that is bright is relatively small. As V100 is gradually decreased relative to V121, the pattern progresses through the stages represented by FIGS. 22b and 22c to the case of FIG. 22d. It is seen that the bright portion of the pattern has grown at the expense of the dark portion, and that the formerly separated bright parts of the pattern are joined by a growing bridge.

Figure 22A:
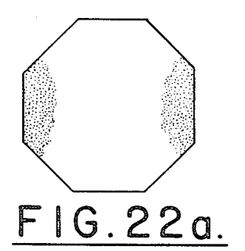
Figure 22B:
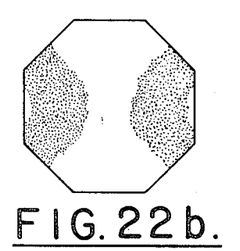
Figure 22C:
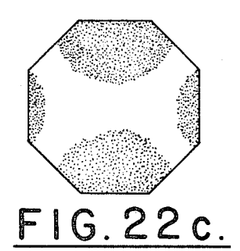
Figure 22D:
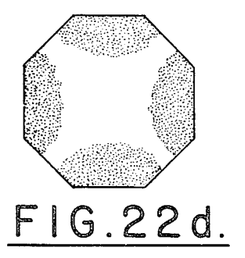
Figure 22E:
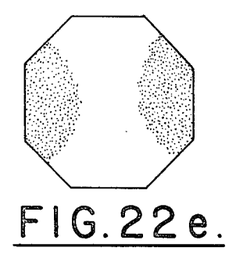
Figure 22F:
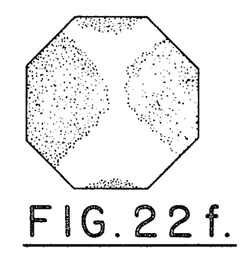
Figure 22G:
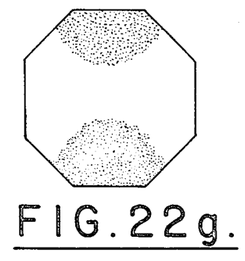
Figure 22H:
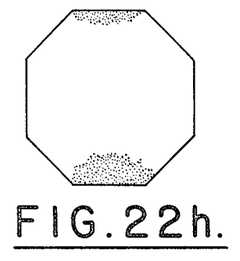

FIG. 22d is the first figure characterized by equal symmetry about both horizontal and vertical axes. A symmetric display results, with the dark hemispherical portions of it equal in size and centered about the horizontal and vertical electrodes 126 and 128, and 127 and 129, respectively. This is the configuration when V100 is just one half of V121 (V100 is 50 volts and V121 is 100 volts).

As the magnitude of V100 continues to drop with respect to V121, the successive stages of the display take the forms shown in the respective FIGS. 22e to 22h. Note that the dark portion of the display has become symmetric about the horizontal axis and two non-connected bright areas of minor magnitude remain as polar caps.

By use of the display, it is readily seen that a first unidirectional voltage may be set, or adjusted, to a predetermined value with respect to a second voltage. It is also apparent that, if the balance point has not been reached, the operator can readily sense which way to adjust the relative voltages to arrive at the desired balance point. This is accomplished, as is evident from FIG. 22, by observing, for example, if the major part of the dark pattern is symmetric about the vertical or the horizontal axis. For example, if the major part of the dark pattern is symmetric about the vertical axis (as in FIG. 22a), the value of V100 must be decreased to reach the balance point of FIG. 22d. Conversely, if the major part of the dark pattern is symmetric about the horizontal axis (as in FIG. 22h), the value of V100 must be relatively increased to reach the balanced relation. The balance detection device becomes a true null indicator simply by using a two-to-one voltage divider in the V121 input circuit.

In the discussion of all of the preceding figures, reference to unidirectional input voltages has been made for the sake of making operation of the several displays simple to understand. It should be understood, however, that dynamic light scattering can, for instance, be induced in nematic and other field sensitive materials by alternating voltages. For example, typical nematic materials respond to electric fields from zero cycles per second to 100 cycles per second. For a given excitation frequency in the above range, the light scattering versus r.m.s. excitation voltage curve has the same threshold behavior as depicted in FIG. 2. For example, one may directly substitute alternating voltage source for unidirectional voltage sources in the systems of FIGS. 4 and 9; they have been shown experimentally to yield substantially the same moving bar and moving window presentations, respectively, as with unidirectional voltages. In the additive circuit of FIG. 4, the two alternating voltage generators are operated in phase, while in the subtractive connection of FIG. 9, 180° out-of-phase operation is employed.

Returning now to the balance or null detector device of FIG. 21, operation of this device using alternating voltage provides additional kinds of displays instead of merely the same kind of display as produced by operation with unidirectional potentials. For example, if the quadripole display of FIG. 21 is driven by alternating voltage generators 130 and 131 respectively, producing alternating voltages V100 and V121, the operator may employ it as a null or balance meter for voltage amplitude, frequency, or phase. If the frequency $\omega_{100}$ of the voltage V100 is not equal to the frequency $\omega_{121}$ of the voltage V121, the consequent display pattern appears to pulsate at the difference frequency between $\omega_{100}$ and $\omega_{121}$. If $\omega_{100}$ and $\omega_{121}$ are adjusted toward equality the frequency of pulsation of the display diminishes accordingly and, when $\omega_{100}$ and $\omega_{121}$ are equal, the figure is static. The exact appearance of the static figure depends upon the phase difference between V100 and V121. If the phase difference is zero, the pattern takes on a characteristic shape distinct from the pattern for finite phase differences. It is readily seen that, for a given ratio of voltage magnitudes, variation of the phase difference causes the display to run through the gamut of stages illustrated in FIG. 22. Thus, the display may be calibrated in terms of phase difference for a given ratio of input voltage magnitudes.

A further aspect of the invention is illustrative of the wide variety of applications in which it may be employed and takes the form of display arrangements with two or more closely spaced but separated layers of field sensitive liquid crystal materials. These multiple-layer stacked arrangements offer several features, since their individual visual effects are additive, one being a wide choice of display patterns in which dissimilar display systems may be combined to yield as a cooperative result further new kinds of displays. Secondly, stacked, multiple-layer displays may be provided in which liquid crystal layers affording identical scan patterns are overlapped, with the consequent result of correspondingly enhanced boundary definition of the combined pattern. These displays achieve more precisely defined boundaries between the opaque and clear images than do single layer displays. Multiple color displays are also possible in such multi-layer panel devices.

Figure 23:
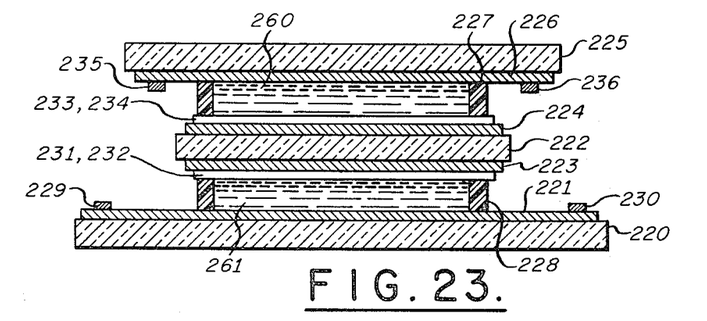
Figure 24:
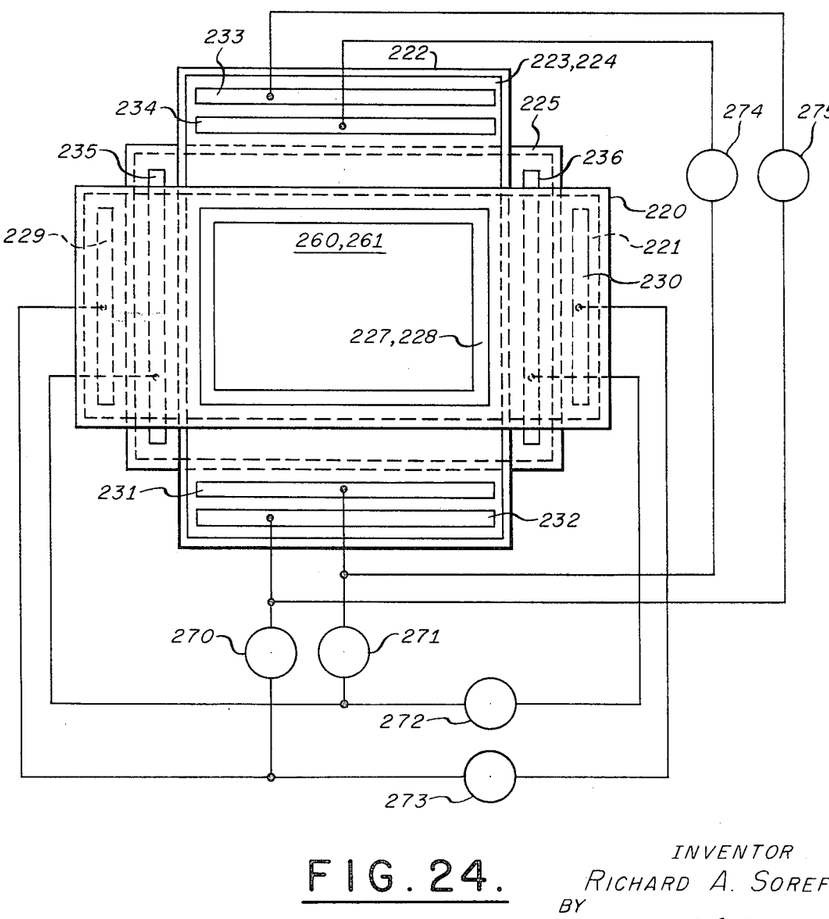

One example of a multi-layer display according to the present invention is illustrated in FIGS. 23 and 24; in this example, two individual cells associated with respective liquid crystal layers 260 and 261 are superimposed one on the other with corresponding transparent electrodes aligned so that corresponding electric field gradients in the electrodes are also aligned. In other words, the optical effect may be that which would result if two individual panels like that of FIGS. 18 and 19 were placed one above the other with the alignment described above. The major difference is that one of the glass plates of the four has been eliminated in FIGS. 23 and 24 and that each side of a single plate 222 has been supplied with a transparent electrode 223, 224 for the sake of placing the parallel layers 260, 261 as close together as possible and so as to avoid undesired parallax effects.

As seen in FIGS. 23 and 24, the embodiment consists of an inner glass plate 222 lying between outer glass plates 220 and 225. Each side of plate 222 is supplied with a transparent high-resistivity electrode means (electrodes 223 and 224, respectively), respectively equipped with low-resistivity strip terminals 231, 232 and 233, 234. In one form of the invention, electrodes 223 and 224 and their associated terminals and voltage sources 274 and 275 are arranged respectively so as to subject liquid crystal layers 260 and 261 to similar electric field gradients.

Outer glass plates 220 and 225 are respectively equipped with high resistivity electrodes 221 and 226, the electrodes having associated with them respective pairs 229, 230 and 235, 236 of low resistivity terminals. The electrodes 221 and 226 and the associated voltage sources 272, 273 are respectively arranged so as to subject liquid crystal layers 260 and 261 to similar electric field gradients, these gradients being at right angles to those produced by electrodes 223, 224 on inner glass plate 222. The enclosure for the active layer 260 is completed by rectangular dielectric wall 227, while that for layer 261 is completed by the similar wall 228.

It is seen that one set of voltage sources, for example, the set including sources 272, 273, produces scanning in the respective liquid crystal layers 260, 261 in the y direction. Similarly, sources 274, 275 produce similar scanning in the x direction. Voltage sources 270, 271 produce voltages corresponding to voltage V12 produced by generator 110 in FIG. 19. In fact, the two active layers 260, 261 and associated elements are exactly alike, single generators can be substituted for each of the generator pairs 270 and 271, 272 and 273, and 274 and 275 of FIG. 24.

The apparatus of FIGS. 23 and 24 as discussed above produces similar visual patterns, ideally one aligned perfectly with the other. This arrangement produces enhanced sharpness of the visually observed pattern. However, especially with the multiplicity of voltage sources shown in FIG. 24, each cell can be cause to produce its own characteristic pattern, each individually changeable in time in any desired manner. Thus, any of many individual patterns may be produced, one above the other. Such overlapping patterns might consist of transparent rectangles, trapezoids, or rhomboids, moving on opaque backgrounds, or vice versa. When similar and aligned rectangular patterns are generated by two superimposed cells, and if the area of each rectangle is shrunk to a small value by using large voltage gradients, the entire panel can be raster scanned in the manner of a flying-spot scanner.

A flying spot scanner can, for example, result from using combinations of voltages, as discussed previously, to generate a rectangular strip in each of the layers 260 and 261 of FIG. 13, but forming one at right angles to the other. In such alignments, a rectangular or square clear area is generated. Similarly useful diamond shaped areas can be generated by superimposing stripes formed at substantially different oblique angles. Either the square or diamond shaped pattern, suitably shrunk in area, can be moved across the screen in a raster scan by applying appropriate voltages to the various electrodes.

A variety of combinations of cells in multi-layer configuration such as in FIG. 24 is possible. For example, a cell like that of FIG. 12 used in cooperation with a cell like that of FIG. 14 can produce a spot that may be scanned in polar coordinates, just as two generators of bar patterns formed at right angles to each other similarly may be used to scan a spot of light in Cartesian coordinates.

Figure 25:
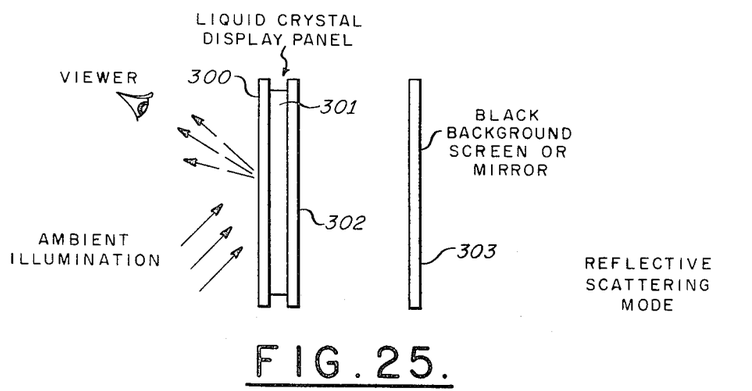
FIGS. 25, 26 and 27 show alternative methods of illumination and of operation of the invention.
Figure 26:
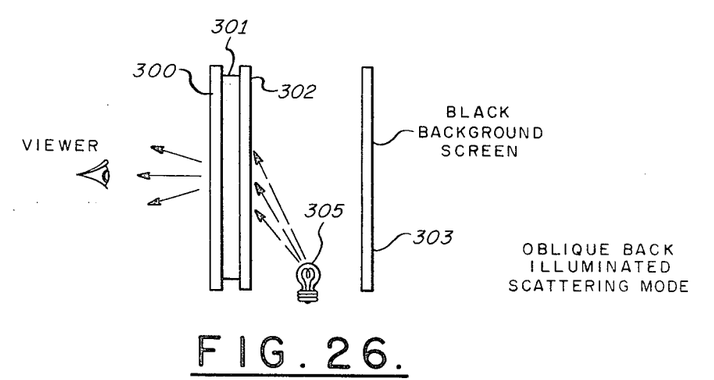
Figure 27:
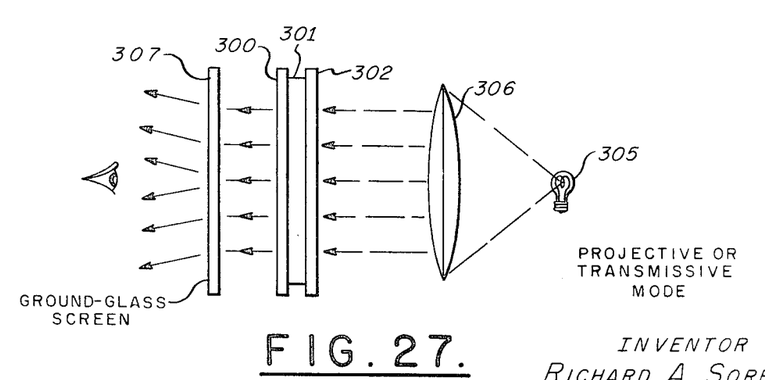

The single or multiple cell devices of the preceding embodiments may be employed, for example, with either of the three types of illumination systems shown in FIGS. 25, 26, or 27, wherein similar reference numerals are used to indicate corresponding parts. The FIG. 25 configuration is that which has been assumed, for the sake of facilitating the discussion, in examining all of the foregoing embodiments.

FIG. 25 again illustrates how a single cell consisting of the parts, for example, shown in FIGS. 3 and 4, is illuminated by ambient light or from a specific frontal light source, the light passing through the viewing electrode system 300, through the active liquid crystal layer 302, and through the back electrode system 302 to impinge up a black screen 303 when not scattered by layer 301. When part of the light is back-scattered toward the viewer, a bright image on a dark background is seen. A mirror may be substituted for the black screen 303. This mode of operation is termed the reflective scattering mode and may also be used in multiple layer devices.

In FIG. 26, the oblique back-illuminated scattering mode of operation of a single cell device is represented. The parts of the system are similar to those of FIG. 25, but now a light source 305 is employed for obliquely illuminating the cell 300, 301, 302 from the back electrode system 302. Light from source 305 is scattered by liquid crystals in their active light scattering state into the eye of the observer. A bright image is formed upon a dark background provided by the black background screen 303. The mode of operation of the system of FIG. 26 may thus be called the oblique back-illuminated scattering mode.

A projection or transmissive scattering mode of operation characterizes the operation of the device of FIG. 27. A single-cell active device consisting as before of elements 300, 301, and 302 is shown. It is placed between a ground glass screen 307 observed by the viewer and a lens 306 for generating a parallel-ray field of light from source 305. In this manner of use of the invention, the undisturbed cell may produce a bright image on the whole of screen 307. When the cell is excited, back-scattering of light occurs in the excited regions, and such excitations produce dark images on the bright background. The multiple layer cells above described may be used advantageously in the projective or transmissive scattering mode of operation.

In addition to its versatility in that it may be employed with different types of lighting arrangements, the inventive concept is of particular significance because it provides means in a liquid crystal flat panel display for continuous or analog movement of the borders between clear and translucent areas formed by external illumination, motion produced simply by continuous changes in respective analog control voltages. The invention permits the size, shape, and location of two-dimensional display patterns to be changed continuously in an analog manner, rather than merely in discrete steps as was achieved in the prior art. A single display module is used, rather than a multiplicity of fixed-area modules requiring a corresponding multiplicity of electrical connections. The invention not only achieves useful results not afforded by prior art liquid crystal displays, but represents a device simpler and less expensive to manufacture, to install, and to operate.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. An electro-optical device of the type for forming an electric field pattern which alters the scattering of light incident thereon comprising:
   first and second electrode means in spaced, mutually cooperative relation adapted to form said electric field pattern, one of said first and second electrode means having a high electrical resistivity,
   means for providing a voltage drop across said high resistivity electrode means for the purpose of causing spatial variation within said electric field pattern, and
   liquid crystal electric field sensitive means disposed between said first and second electrode means for providing a change in the optical scattering level within said liquid crystal means of incident light in accordance with a predetermined value of said electric field.

2. Apparatus as described in claim 1 wherein at least one of said electrode means is transparent and is formed on a transparent substrate.

3. Apparatus as described in claim 1, wherein one of said electrode means is provided with spaced-apart, cooperative, high-electrical-conductivity, elongate-terminal means.

4. Apparatus as described in claim 3 wherein a first electrical voltage source is coupled in a first circuit with said spaced-apart terminal means.

5. Apparatus as described in claim 4, wherein a second electrical voltage source is coupled between said first circuit and said second electrode means.

6. Apparatus as described in claim 1 wherein said resistivity is tapered in at least one direction.

7. Apparatus as described in claim 2 wherein:
   said first and second electrode means cooperate respectively with first and second substrates for forming substantially parallel first and second walls for providing a partial enclosure of said electric field sensitive means, and
   said partial enclosure is made complete by a thin dielectric wall affixed between said parallel walls.

8. Apparatus as described in claim 1 including means for illuminating said electric field sensitive means.

9. An electro-optical device of the type which alters the scattering of light thereon comprising:
   first and second electrode means in spaced electric-field defining cooperative relation,
      one of said electrode means being sectoral in shape,
         said sectoral electrode having radially extending high-electrical-conductivity elongate terminals adjacent its radial boundaries,
   electric field sensitive means lying between said first and second electrode means,
   voltage source means for applying a voltage across said electric field sensitive means, and
   voltage source means coupled in circuit to said elongate terminals.

10. Apparatus as described in claim 9 wherein said electrode means of sectional shape has a resistivity which decreases along the radii of said sector toward increasing values of radial dimension.

11. An electro-optical device of the type which alters the scattering of light thereon comprising:
   first and second electrode means in spaced electric-field defining cooperative relation,
      one of said electrode means being sectoral in shape,
         said circular electrode having a ring shaped high-electrical-conductivity terminal adjacent its periphery and substantially smaller terminal substantially at its center,
   electric field sensitive means lying between said first and second electrode means,
   voltage source means for applying a voltage between ring shaped and central terminals, and
   voltage source means for applying a voltage across said electric field sensitive means.

12. An electro-optical device of the type which alters the scattering of light thereon comprising:
   first and second electrode means in spaced electric-field defining cooperative relation,
      one of said electrode means being sectoral in shape, said sectoral electrode having a circular-arc-shaped, high-electrical-conductivity terminal adjacent its arcuate periphery and a substantially smaller terminal at its center of curvature,
   electric field sensitive means lying between said first and said second electrode means,
   voltage source means for applying a voltage between said arc-shaped terminal and said central terminal, and
   voltage source means for applying a voltage across said electric field sensitive means.

13. An electro-optical device of the type for forming an electric field pattern which alters the scattering of light incident thereon comprising:
   first and second electrode means in spaced mutually cooperative relation adapted to form said electric field pattern,
   first means for providing a voltage drop across said first electrode for the purpose of causing spatial variation within said electric field pattern in a first direction,
   second means for providing a voltage drop across said second electrode for the purpose of causing spatial variation within said electric field pattern in a second direction, and an electric field sensitive means disposed between said first and said second electrode means for providing a change in the optical scattering level therein in accordance with a predetermined value of said electric field.

14. Apparatus as described in claim 13 wherein said first and said second means for providing respective voltage drops across said respective electrode means produce mutually perpendicular variations within said electric field pattern.

15. Apparatus as described in claim 13 wherein said first and said second electrode means are provided with respective pairs of spaced-apart, cooperative, elongate, high-electrical-conductivity terminal means.

16. Apparatus as described in claim 15 wherein:
a first voltage source is coupled in circuit across said pair of terminal means associated with said first electrode means,
a second voltage source is coupled in circuit across said pair of terminal means associated with said second electrode means, and
a third voltage source is coupled in circuit between said first and said second electrode means.

17. An electro-optical device of the type which alters the scattering of light incident thereon comprising:
first and second electrode means in spaced mutually cooperative relation for forming an electric field pattern,
one of said electrode means having a high resistivity,
a first pair of terminal means spaced apart on one axis of said high resistivity electrode means,
a second pair of terminal means spaced apart on a second axis of said high resistivity electrode means, and
an electrical field sensitive means disposed between said first and said second electrode means for providing a change in the optical scattering level therein in accordance with a predetermined value of said electric field.

18. Apparatus as described in claim 17, wherein said first and said second axes of said high resistivity electrode means are substantially at right angles.

19. Apparatus as described in claim 17 wherein said first electrode means has first, second, third, and fourth terminal means located at respective corners thereof and said second electrode means has a fifth terminal means located at one corner thereof.

20. Apparatus as described in claim 17, wherein:
a first electrical voltage source is coupled in circuit between first pairs of opposed terminal means and second pairs of opposed terminal means and
a second electrical voltage source is connected between said second pair of opposed terminal means and said fifth terminal means.

21. An electro-optical device of the type which alters the scattering of light incident thereon comprising:
a first substrate,
first electrode means mounted on a surface of said first substrate,
a first layer of electric field sensitive material mounted on said first electrode means,
second electrode means mounted on one surface of a second substrate and contacting said first layer of field sensitive electric material,
at least one of said first and second electrode means having resistivity and being adapted to supply a voltage varying continuously along a first direction between said first and second electrodes,
third electrode means mounted on a second surface of said second substrate,
a second layer of electric field sensitive material mounted on said third electrode, and
fourth electrode means mounted on one surface of a third substrate and contacting said second layer of electric field sensitive material.
at least one of said third and fourth electrode means having high resistivity and being adapted to supply a voltage varying continuously along a direction between said third and fourth electrodes at a substantial angle to said first direction, 22. Apparatus as in claim 21, including
first, second, third, and fourth voltage sources respectively applying voltages at opposed ends of said first, second, third, and fourth electrode means,
a fifth voltage source for supplying a voltage across first electric field sensitive means, and
a sixth voltage source for supplying a voltage across said second electric field sensitive means.

References Cited

UNITED STATES PATENTS 3,449,112  3/1970  Heilmeier et al. ______ 178—7.7

OTHER REFERENCES

Dynamic Scattering: "A New Electrooptic Effect in Certain Classes of Nematic Liquid Crystal"; Heilmeier et al., Proceedings of the IEEE; vol. 56, No. 7, July 1968.

"Liquid Crystal Light Modulator and Scanner"; Holzman; IBM Tech. Disclosure Bulletin, June 1, 1965.

RONALD L. WIBERT, Primary Examiner

C. CLARK, Assistant Examiner

U.S. Cl. X.R.

350—150; 324—104